United States Patent [19]

Hirata

[11] 4,428,002
[45] Jan. 24, 1984

[54] SPECIAL EFFECTS VIDEO DISC REPRODUCING SYSTEM FOR ELIMINATING PICTURE FLICKER

[75] Inventor: Atsumi Hirata, Fujisawa, Japan

[73] Assignee: Victor Company of Japan, Ltd., Yokohama, Japan

[21] Appl. No.: 245,456

[22] Filed: Mar. 19, 1981

[30] Foreign Application Priority Data

Mar. 19, 1980 [JP] Japan .................. 55-35618

[51] Int. Cl.$^3$ .............................. H04N 5/76
[52] U.S. Cl. .................... 358/342; 358/907
[58] Field of Search ............ 358/312, 342, 907, 311, 358/335; 360/10, 10.1, 10.2, 14.1, 14.2, 14.3; 369/43, 44, 47, 48, 50, 111, 30, 32

[56] References Cited

U.S. PATENT DOCUMENTS

| | | | |
|---|---|---|---|
| 4,190,859 | 2/1980 | Kinjo | 369/44 X |
| 4,321,621 | 3/1982 | Kinjo et al. | 369/43 X |
| 4,322,748 | 3/1982 | Tatsuguchi | 358/342 |
| 4,340,907 | 7/1982 | Hirata et al. | 369/47 X |

Primary Examiner—Bernard Konick
Assistant Examiner—Donald McElheny, Jr.
Attorney, Agent, or Firm—Louis Bernat

[57] ABSTRACT

In a special mode video disc reproduction system in which two identical frames of video signals are recorded for each disc revolution of spiral tracks, and further recorded with a first or a second reference signal having mutually different frequencies on a reference signal tract between adjacent tracks of the recording medium the first and second reference signals are alternately changed over and recorded on the reference signal track every one revolution of the disc, and the disc is further recorded with a third reference signal at the vertical blanking period recording positions of the corresponding recording positions on the track where the first and second reference signals are changed over. A skip pulse supplying circuit generates skip pulses for skipping the reproducing element at vertical blanking period positions opposing positions where the third reference signal is recorded on the track, upon double-speed reproduction mode in the forward direction. It generates skip pulses at two vertical blanking period positions other than the positions where the third reference signal is recorded and the vertical blanking period positions opposing these positions where the third reference signal is recorded upon triple-speed reproduction mode in the forward direction. And it generates skip pulses at three vertical blanking period positions other than the positions where the third reference signal is recorded, upon quadruple-speed reproduction mode in the forward direction. Such reproduction modes of operation eliminate undesired flicker in the reproduced picture.

4 Claims, 14 Drawing Figures

SPECIAL EFFECTS VIDEO DISC REPRODUCING SYSTEM FOR ELIMINATING PICTURE FLICKER

BACKGROUND OF THE INVENTION

The present invention relates to special reproducing systems in rotary recording medium reproducing apparatuses, and more particularly to a special reproducing system in a reproducing apparatus for reproducing a video signal from a rotary recording medium on which the signal has been previously recorded along a spiral track by use of a reproducing transducer, where the above system is capable of moving the reproducing transducer to an adjacent track to perform a special reproduction wherein the motion of the reproduced picture is different from that upon normal reproduction, without introducing irregular and unstable motion.

A new information signal recording and/or reproducing system has been proposed in a U.S. patent application Ser. No. 785,095 entitled "INFORMATION SIGNAL RECORDING SYSTEM" filed Apr. 6, 1977, and now U.S. Pat. No. 4,331,976, issued May 25, 1982, of which the assignee is the same as that of the present application. According to this proposed system, the recording system forms pits in accordance with the information signal being recorded along a spiral track on a flat disc shaped recording medium (hereinafter referred to as disc), without forming a groove therein. In this reproducing system, a reproducing stylus traces over along this track thereby to reproduce the recorded information signal in response to variations in the electrostatic capacitance.

In this system, since a groove for guiding the reproducing stylus is not provided on the disc, pilot or reference signals should be recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

By the use of this previously proposed system, there is no possibility whatsoever of the reproducing stylus or the disc being damaged since the recording track has no groove. The stylus can trace the same portion of the track repeatedly many times, whereby a special reproduction such as still, slow motion, or quick motion reproduction becomes possible.

Thus, in a U.S. patent application Ser. No. 4,813 entitled "SPECIAL REPRODUCING SYSTEM IN AN APPARATUS FOR REPRODUCING VIDEO SIGNALS FROM A ROTARY RECORDING MEDIUM" filed Jan. 19, 1979, now U.S. Pat. No. 4,340,907 issued July 20, 1982 of which the assignee is the same as that of the present application, a special reproducing system in a disc reproducing apparatus was proposed which is capable of performing a special reproduction in which a picture having a motion different from that upon normal reproduction is obtained in an excellent manner.

The special reproducing system comprises a reproducing element for tracing the track of the disc and picking up the recorded signal, a tracking control mechanism for operating in response to skip pulses applied thereto to cause the reproducing element to shift to an adjacent track turn of the spiral track thereby to undergo skipping, and a skip pulse generating circuit for generating skip pulses with timings corresponding to the vertical blanking period positions of the recorded video signal, where the skip pulses are of a number corresponding to an operational mode for carrying out a special reproduction differing from normal reproduction at every rotational period of the rotary recording medium, and supplying the skip pulses to the tracking control mechanism. The reproducing element is skipped to an adjacent track turn within the vertical blanking period of the recorded video signal, by the tracking control mechanism responsive to the skip pulses.

Accordingly, the noise introduced when the reproducing element moves to an adjacent track does not appear in the picture, and a special reproduction such as still reproduction, slow-motion and quick-motion reproduction in the forward direction, and normal-speed, slow-motion, and quick-motion reproduction in the backward direction can be performed in which a fine picture is obtained.

Hence, due to realizing conditions such as the recording capacity of the disc, the rotational speed of the disc, and the diameter of the disc, normally, the system is standardized wherein a video signal amounting to two frames, that is, a video signal amounting to four fields is recorded per one track turn (spiral track part corresponding to one revolution of the disc). When a still reproduction is performed by reproducing only the same track of the disc recorded according to the above standard, the image of the still picture flickers and the reproduced picture becomes unpleasant to watch when the movement in the picture where the still reproduction is performed is fast, since the information contents (pictures) of two different frames are alternately reproduced.

Accordingly, in order to overcome the above described problem, a system was proposed in which a video signal amounting to one frame of information is recorded per one track turn, by recording a video signal having the information content of the preceding frame into the subsequent frame. That is, the same information content for the preceding one frame is repeated in the subsequent frame, in every track turn. According to this system, flicker is not introduced in the image of the reproduced picture as in the above case, because the information contents of the same frame are repeatedly reproduced upon still reproduction.

However, when a disc on which a video signal having information contents amounting to one frame is recorded in groups of two frames per each track turn as described above, is reproduced in reproduction modes such as a double, triple, and quadruple speed forward quick-motion reproductions, information contents amounting to one frame are completely dropped out every plurality of frames of the reproduced signal. Hence, in this part of the reproduced signal where the dropout of information contents occur, the following field contains information contents of a field which is two fields after, that is, a field skipped by one field from a certain field. Accordingly, in the quick-motion reproduction modes, the movement in the reproduced picture is not smooth, and is irregular and unstable.

SUMMARY OF THE INVENTION

Accordingly, a general object of the present invention is to provide a novel and useful special reproduction system in a rotary recording medium reproducing apparatus in which the problems associated with the above previously proposed special reproduction system have been overcome and modified.

Another and more specific object of the present invention is to provide a special reproduction system in a rotary recording medium reproducing apparatus, in which at least the information contents of one field in each track is reproduced for all the tracks, in order to obtain a quick motion reproduced picture having smooth movements.

Other objects and further features of the invention will be apparent from the following detailed description with respect to preferred embodiments of the invention when read in conjunction with the accompanying drawings.

DETAILED DESCRIPTION

Figure 1:
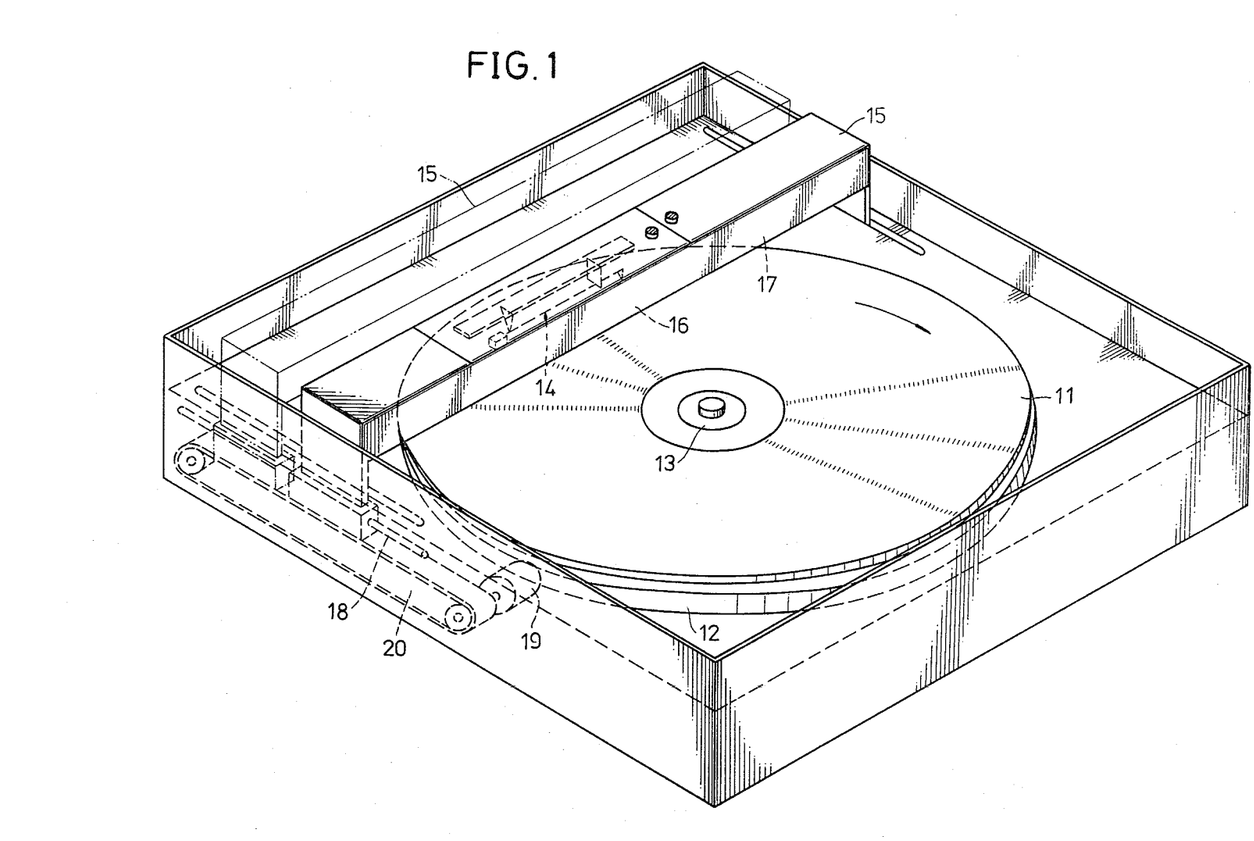
FIG. 1 is a perspective view showing an example of a rotary recording medium reproducing apparatus to which a special reproduction system according to the present invention can be applied.

The general features of the exterior of a reproducing apparatus for reproducing a rotary recording medium, in which a special reproducing system according to the invention can be applied, is illustrated in FIG. 1. In this apparatus, a disc 11 is a rotary recording medium having a video signal recorded thereon. The disc 11 is set on and clamped onto a turntable 12 by a clamper 13. The disc 11 is thus rotated unitarily with the turntable 12 at a rotational speed of 900 rpm, for example.

A signal pickup device 14, used as a reproducing transducer, is mounted at a re-entrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known. The carriage 15 is disposed horizontally above the turntable 12, and is guided at its ends by a pair of parallel horizontal guide bars 18 (only one shown). This carriage 15, driven by an endless belt 20 which is driven by a motor 19, moves continuously and linearly in a direction from the outer peripheral part to the inner peripheral part at a speed equal to the distance of one track pitch per revolution of the turntable 12, during a forward normal reproducing mode. The carriage movement is in synchronism with the rotation of the turntable. As a result of this movement of the carrier 15, a stylus of the signal pickup device 14 travels radially across the rotating disc 11 and relatively traces the spiral track of the disc 11.

Figure 2:
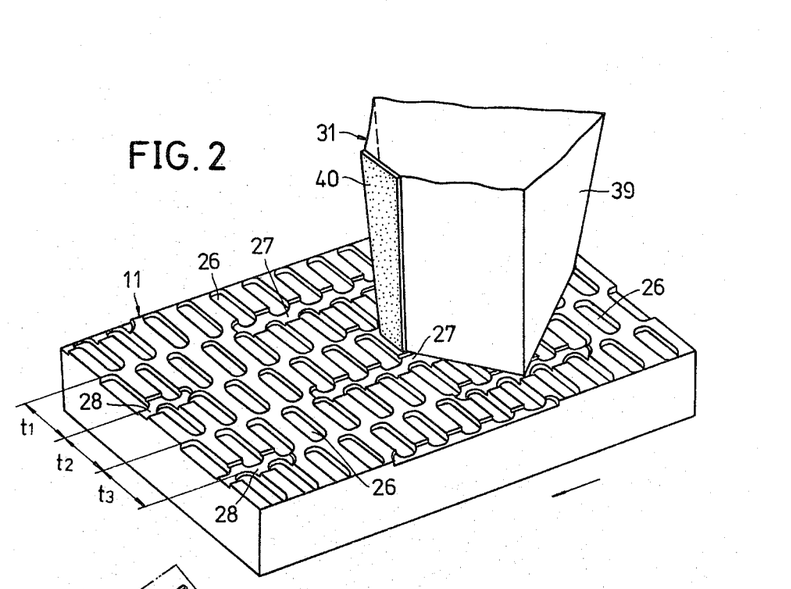
FIG. 2 is a perspective view, on a large scale, showing a part of a rotary recording medium together with a tip part of a reproducing stylus.

A video signal is recorded on a spiral track with pits formed on the disc 11 responsive to the information contents of the signal. One part of this track is shown in an enlarged scale in FIG. 2. In FIG. 2 track turns of a single continuous spiral track, corresponding to each revolution of the disc 11, are designated by $t_1$, $t_2$, $t_3$ . . . . Each track turn is constituted by the formation of pits 26 of the main information signal along the plane track path and has no stylus guide groove formed therein. With respect to one track turn $t_1$, in every horizontal scanning period (H) at a position corresponding to the horizontal blanking period, pits 27 of the first reference signal fp1 are formed on one lateral side of the track as viewed in the track path direction. Pits 28 of the second reference signal fp2 are formed on the other side of the track.

In an intermediate position between the centerlines of adjacent track turns, only pits of either one kind of the pits 27 and 28 of the above reference signals fp1 and fp2 are formed, and with respect to one track, moreover, the sides on which the pits 27 and 28 are formed are alternated for every track turn. That is, if pits 27 and 28 are respectively formed on the right and left sides of one track turn, for example, pits 28 and 27 will respectively be formed on the right and left sides of each of the adjacent track turns.

Figure 4:
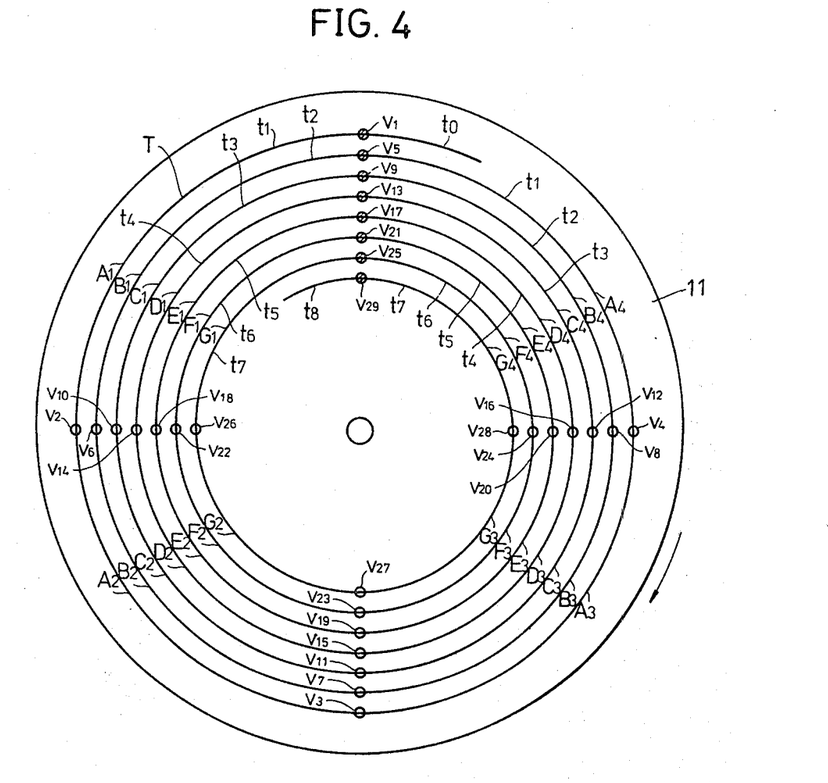
FIG. 4 is a diagrammatic plan view indicating vertical synchronizing signal positions on a track pattern of a rotary recording medium.

On the disc 11, as indicated in FIG. 4, a video signal is recorded along a spiral track T for two frames, that is, four fields, per one revolution of the disc. In FIG. 4, the tracks of the reference signals fp1 and fp2 are omitted. The positions of the vertical synchronizing signals of respective fields are designated by reference characters V1, V2, V3, . . . , and the successive track parts corresponding to one revolution of the disc of a single spiral track I will respectively be designated by track turns $t_1$, $t_2$, $t_3$, . . . . Furthermore, a third reference signal fp3 is recorded at the starting end positions V1, V5, V9, . . . of each track turns $t_1$, $t_2$, $t_3$, . . . . A video signal of four fields, namely A1, A2, A3, and A4, is recorded in the track $t_1$. A signal having the information content for the preceding frame (fields A1 and A2) is repeated in the second frame (fields A3 and A4), so that the above described flicker in the reproduced picture is not introduced upon still reproduction. Similarly, frame signals having the same information contents are repeated in groups of two frames in the tracks $t_2$, $t_3$, $t_4$, . . . respectively as signals comprising four fields, that is, B1 through B4, C1 through C4, D1 through D4, . . . .

Figure 3:
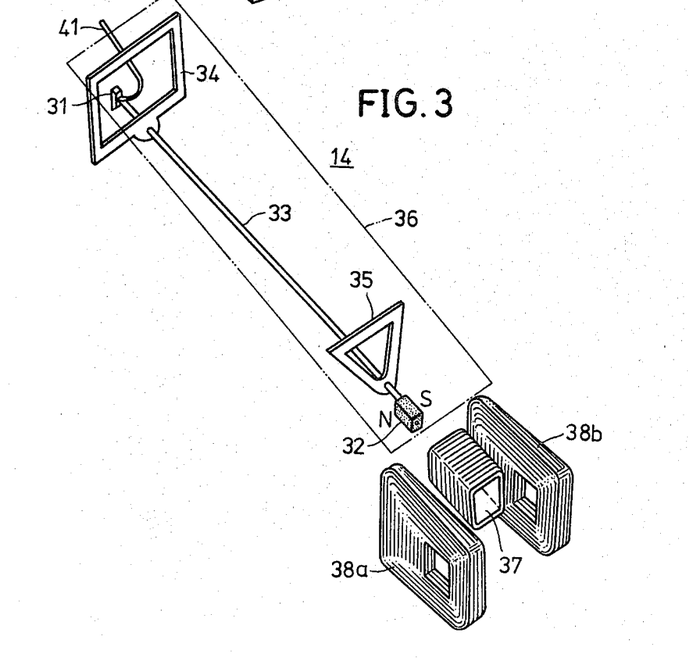
FIG. 3 is an exploded perspective view showing an example of a reproducing transducer in the reproducing apparatus shown in FIG. 1.

One example of the signal pickup device 14 indicated in FIG. 1 will now be described with reference to FIG. 3. This pickup device 14 has a relatively long cantilever arm 33 provided with a reproducing stylus 31 at its distal free end and a permanent magnet member 32 at its proximal root end. This cantilever arm 33 is supported by dampers 34 and 35 which are fixed to the lower surface of a support plate 36.

The support plate 36 is fitted into and held by a holding structure. A coil 37 used for tracking, and a pair of coils 38a and 38b used for jitter compensation disposed on both sides of the coil 37, are fixed to the lower surface of the support plate 36. The above permanent magnet member 32 is fitted into the coil 37 with gaps formed therebetween.

The tip end of the reproducing stylus 31 has a shape shown in FIG. 2. The reproducing stylus 31 is constituted by a stylus structure 39 having a disc tracing surface which has a width greater than a track width, and an electrode 40 fixed to the rear face of the stylus structure 39. The electrode 40 is connected with a metal ribbon 40, as shown in FIG. 3. As the reproducing stylus 31 traces along a track on the disc 11 rotating in a direction indicated by arrow, the video signal recorded thereon by the formation of pits is reproduced as variations in the electrostatic capacitance between the surface of the disc 11 and the electrode 40 of the reproducing stylus 31.

Figure 5:
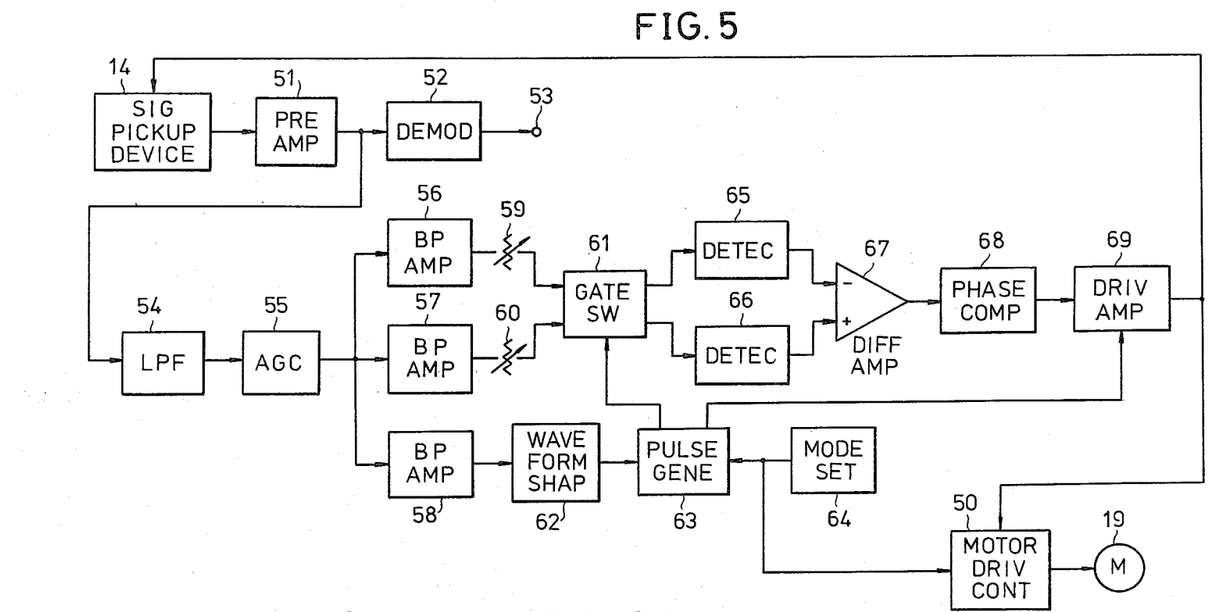
FIG. 5 is a systematic block diagram showing one embodiment of a special reproduction system according to the present invention in a rotary recording medium reproducing apparatus.

In the system shown in FIG. 5, a reproduced signal picked up from the disc 11 as minute variations in the electrostatic capacitance by the reproducing stylus 31 of the signal pickup device 14, is supplied to a preamplifier 51 having a resonant circuit. The resonance frequency of the resonant circuit varies in response to this variation in the electrostatic capacitance, and is formed into a signal of a desired level. The resulting output of the preamplifier 51, is demodulated into the original video signal by a demodulator 52 and is obtained as an output through an output terminal 53.

The output signal of the preamplifier 51 is supplied to a lowpass filter 54 wherein the reference signals fp1, fp2, and fp3 are separated. The output reference signals pass through an automatic gain control circuit 55 and are respectively supplied to amplifiers 56, 57, and 58. Here, each of the amplifiers 56, 57, and 58 is a kind of a band-pass amplifier respectively designed to have steep passing frequency characteristics at only the respective frequency fp1, fp2, and fp3. As a result, the signals having frequencies fp1 and fp2 are respectively separated and obtained from the amplifiers 56 and 57. These signals respectively pass through level adjustors 59 and 60, wherein the levels of the signals are adjusted. The resulting signals are then supplied to a gate switching circuit 61.

The signal fp3 separated and amplified at this bandpass amplifier 58, is supplied to a waveform shaping circuit 62 comprising a Schmitt circuit. The signal thus supplied to the waveform shaping circuit 62 undergoes waveform-shaping so that the signal is not affected by noise and other influences. The signal thus subjected to the above waveform-shaping is then supplied to a pulse generating circuit 63. The resulting output switching pulses obtained from this pulse generating circuit 63, are supplied to the gate switching circuit 61.

The gate switching circuit 61 performs switching of the signals fp1 and fp2 every one revolution period of the disc 11 upon normal reproduction, in response to the above switching pulses applied thereto. Hence, due to the switching pulses which reverse polarity every two frames (1/15 seconds), the signals fp1 and fp2 are always respectively supplied to detecting circuits 65 and 66 with predetermined polarities, from the gate switching circuit 61.

The detecting circuits 65 and 66 detect the envelopes of their respective input reference signals and convert the input reference signals into DC voltages. These DC voltages are then supplied to a differential amplifier 67. The differential amplifier 67 compares the output signals of the two detecting circuits 65 and 66 which vary in response to the reproduced levels of the signals fp1 and fp2, and generates an output tracking error signal which indicates the tracking error direction and the error quantity. This error signal passes through a phase compensation circuit 68 and is further amplified to a specific level by a driving amplifier 69.

The output signal of the driving amplifier 69 is applied to the coil 37 of the signal pickup device 14 as a control signal, to control the signal pickup device 14. As a result, the permanent magnet member 32 undergoes displacement within the coil 37, and, accompanied by this movement of the coil 37, the cantilever 33 also undergoes displacement, whereby the reproducing stylus 31 is tracking controlled so that the above tracking error signal becomes zero, that is, so that the stylus 31 correctly traces over the track T of the disc 11. Furthermore, the output signal of the driving amplifier 69 is also supplied to a motor driving control circuit 50 to control the rotational driving of the motor 19 which moves the signal pickup device 14, so that a tracking control is performed in a state where the cantilever of the signal pickup device 14 is constantly positioned at the neutral position.

The pulse generating circuit 63 operates in response to the reproducing mode set by a control part 64 for setting the reproducing mode, and generates switching pulses and skip pulses, which are respectively supplied to the gate switching circuit 61 and the driving amplifier 69.

Figure 6:
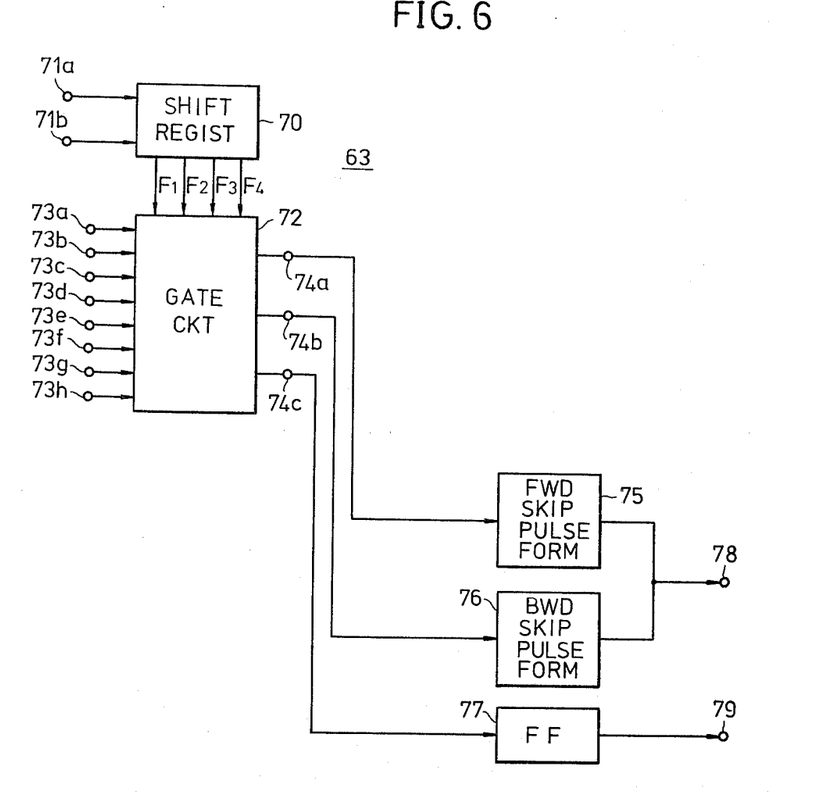
FIG. 6 is a systematic block diagram showing one embodiment of a pulse generating circuit constituting an essential part of the special reproduction system shown in FIG. 5.
Figure 7:
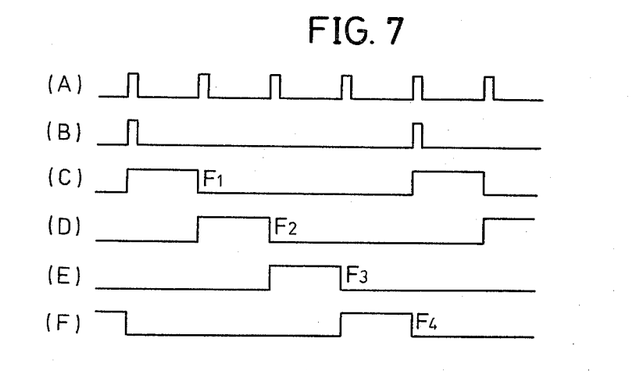
FIGS. 7(A) through 7(F) are time charts showing signal waveforms for explaining the operation of a shift register in the circuit shown in FIG. 6.

One embodiment of the pulse generating circuit 63 which forms an essential part of the block system shown in FIG. 5 will now be described with reference to FIG. 6. A reference signal fp3 having a waveform shown in FIG. 7(B) supplied from the waveform shaping circuit 62, is supplied as data to a four-bit shift register 70 through a terminal 71a, and a vertical synchronizing signal having a waveform shown in FIG. 7(A) is also supplied to the four-bit shift register 70 as a clock pulse through a terminal 71b. The four-bit shift register 70 produces four kinds of output signals F1, F2, F3, and F4 respectively shown in FIGS. 7(C), 7(D), 7(E), and 7(F), which respectively have timings which are mutually and successively staggered every one field period, and supplies these four kinds of output signals to a gate circuit 72.

Signals are respectively applied to terminals 73a through 73h of the gate circuit 72 according to the reproducing mode set at the control part 64. The signals are respectively applied to the terminals 73a through 73e of the gate circuit 72 upon setting of the reproduction mode to a quintuple speed, quadruple speed, triple speed, double speed, and normal speed reproduction in the forward direction. On the other hand, the signals are respectively applied to the terminals 73f through 73h of the gate circuit 72 upon setting of the reproduction mode to a triple speed, double speed, and normal speed reproduction in the backward direction. Skip pulses for quick-motion reproduction in the forward direction, skip pulses for quick-motion reproduction in the reverse direction, and switching pulses, respectively existing having timings which will be described hereinafter, are respectively obtained from output terminals 74a, 74b, and 74c of the gate circuit 72, and respectively supplied to a forward skip pulse forming circuit 75, a backward skip pulse forming circuit 76, and a T-type flip-flop 77.

The signals supplied to the forward and backward skip pulse forming circuits 75 and 76 are respectively formed into forward and backward skip pulses having predetermined waveforms, and are supplied to the driving amplifier 69 through an output terminal 78. Moreover, the output switching pulses of the flip-flop 77 are obtained from an output terminal 79, and supplied to the gate switching circuit 61.

Figure 8:
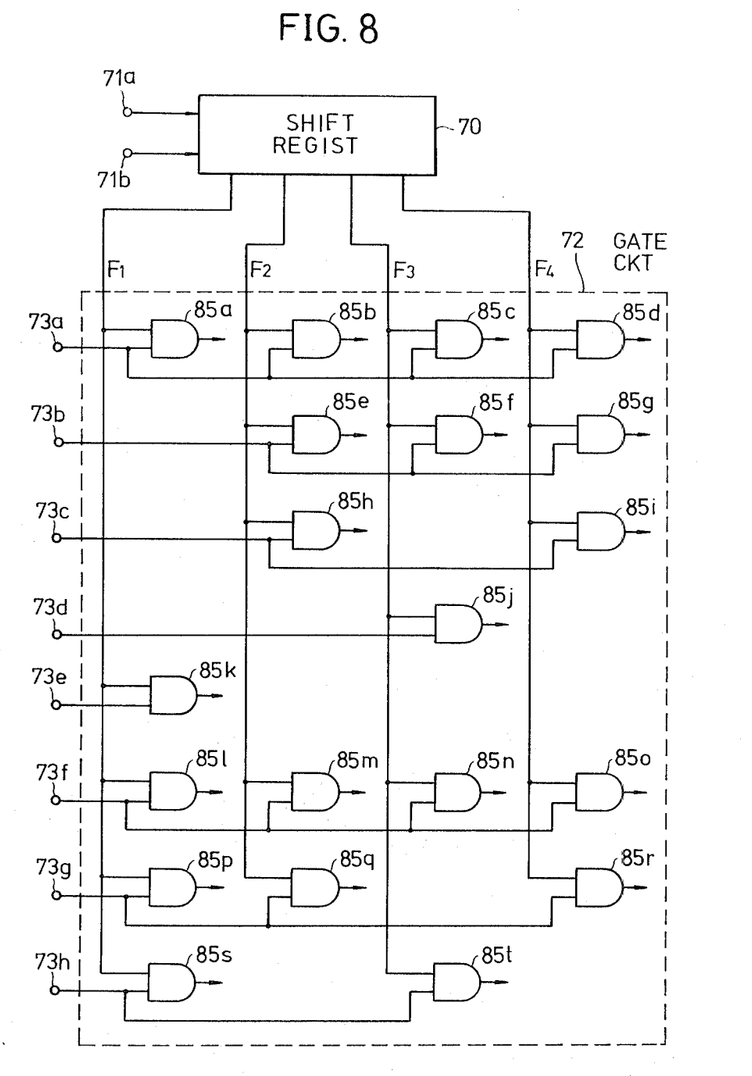
FIG. 8 is a systematic circuit diagram showing one embodiment of a gate circuit in the pulse generating circuit shown in FIG. 6.

The gate circuit 72 has a circuit organization, for example, as shown in FIG. 8. Upon quintuple-speed reproduction mode in the forward direction, a signal is applied to the terminal 73a, and signals having the timings of the signals F1 through F4 are respectively provided as outputs from AND gates 85a through 85d. Similarly, upon quadruple-speed reproduction mode in the forward direction, signals having the timings of the signals F2 through F4 are provided as outputs from AND gates 85e and 85g. Upon triple-speed reproduction mode in the forward direction, signals having the timings of the signals F2 and F4 are obtained from AND gates 85h and 85i, and upon double-speed reproduction mode in the forward direction, a signal having the timing of the signal F3 is obtained from an AND gate 85j. Furthermore, a signal having the timing of the signal F1 is obtained from an AND gate 85K upon normal-speed reproduction mode.

These outputs of the AND gates 85a through 85j are respectively supplied to the forward skip pulse forming circuit 75 through an OR gate (not shown) from the terminal 74a, and formed into forward-direction skip pulses. In addition, the outputs of the AND gates 85b through 85k are respectively supplied to the flip-flop 77 through an OR gate (not shown) from the terminal 74c, and formed into switching pulses.

During triple-speed reproduction mode in the backward direction, a signal is applied to the terminal 73f, and signals having the timings of the signals F1 through F4 are produced as outputs from AND gates 85l through 85o. Upon double-speed reproduction mode in the backward direction, signals having the timings of the signals F1, F2 and F4 are produced as outputs from AND gates 85p through 85r. Moreover, signals having the timings of the signals F1 and F3 are obtained from AND gates 85s and 85t, upon normal-speed reproduction mode in the backward direction.

These outputs of the AND gates 85l through 85t are supplied by way of an OR gate (not shown) through the terminal 74b to the backward skip pulse forming circuit 76 to be formed into backward-direction skip pulses. The outputs of the AND gates 85m, 85n, 85o, 85q, 85r, and 85t are supplied by way of an OR gate (not shown) through the terminal 74c to the flip-flop 77 and formed into switching pulses. The skip pulse forming circuits 75 and 76 and the flip-flop 76 respectively form skip pulses and switching pulses having timings in which the rises are equal to those of the timings of the signals F1 through F4.

When a forward-direction or backward-direction skip pulses are applied to the coil 37 of the signal pickup device 14 through the diving amplifier 69, the reproducing stylus 31 is forcibly skipped by one track turn in the radially inward or outward direction of the disc 11, and shifted to an adjacent track. The changeover polarity of the gate switching circuit 61 is reversed every time switching pulses are applied thereto.

Figure 9A:
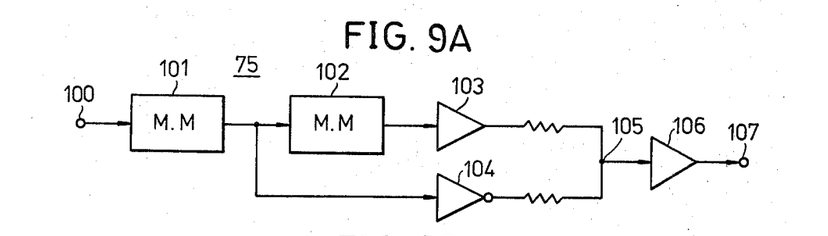
FIGS. 9A and 9B are systematic circuit diagrams respectively showing embodiments of the skip pulse forming circuit shown in FIG. 6.
Figure 10A:
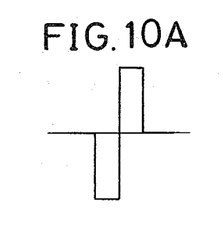
FIGS. 10A and 10B are time charts respectively showing waveforms of the skip pulses obtained from the circuits shown in FIGS. 9A and 9B.

The forward skip pulse forming circuit 75 has a circuit organization, for example, as shown in FIG. 9A. The signal from the output terminal 74a of the gate circuit 72 is applied to an input terminal 100 of this circuit 75 and triggers a monostable multivibrator 101. The falling edge of the output signal waveform obtained from this monostable multivibrator 101 triggers a monostable multivibrator 102. The output of the monostable multivibrator 101 is inverted by an inverter 104, and the output of the monostable multivibrator 102 is passed through an amplifier 103 and added to the inverted signal from the inverter 104 at a point 105. The signal resulting from this addition is passed through an amplifier 106 and is obtained through an output terminal 107 as forward skip pulses having a waveform shown in FIG. 10A.

Figure 9B:
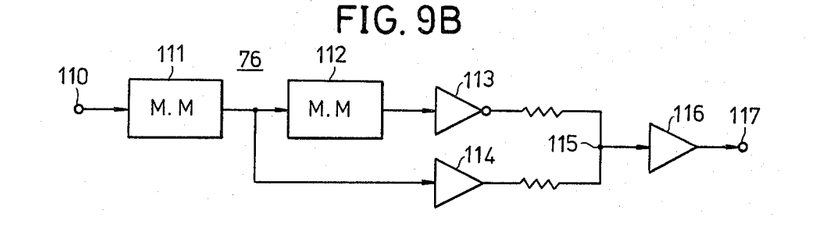
Figure 10B:
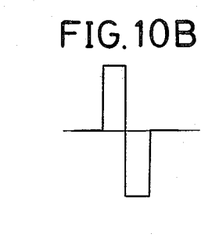

The backward skip pulse forming circuit 76 has a circuit organization, for example, as shown in FIG. 9B. The signal from the output terminal 74b of the gate circuit 72 is applied to an input terminal 110 of this circuit 76 and triggers a monostable multivibrator 111. The falling edge of the output signal waveform obtained from this monostable multivibrator 111 trigger a monostable multivibrator 112. The output of the monostable multivibrator 112 is inverted by an inverter 113 and added to the output of monostable multivibrator 111 which has passed through an amplifier 114 at a point 115. The signal resulting from this addition is passed through an amplifier 116 and is obtained through an output terminal 117 as backward skip pulses having a waveform shown in FIG. 10B. It should be noted that in both FIG. 10A and FIG. 10B, the positive and negative pulses share a common edge so that one pulse follows immediately after the other.

Next, description will be given with respect to the fields of the reproduced signals upon double-speed reproduction according to the system of the present invention.

Figure 11:
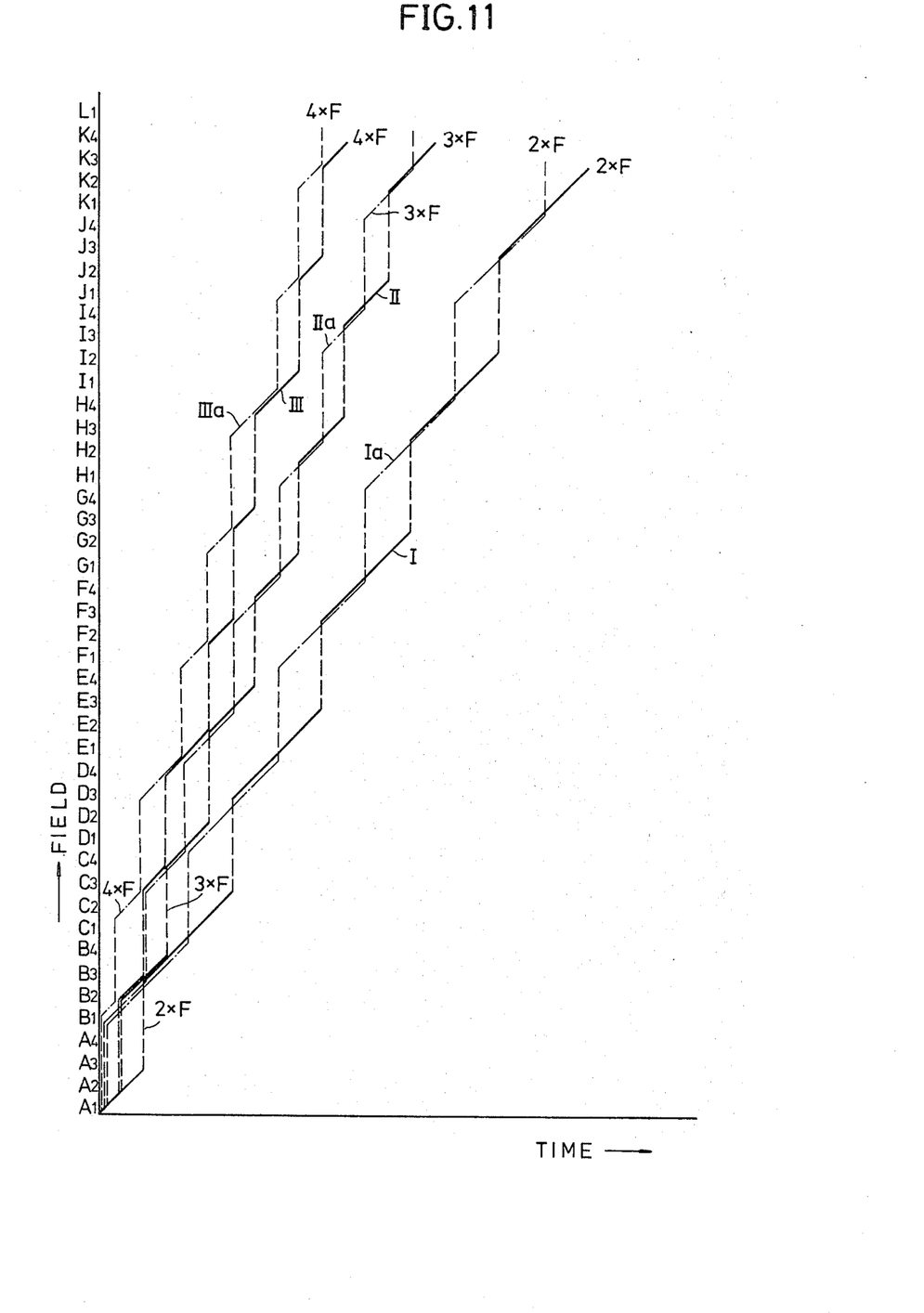
FIG. 11 is a diagram for explaining the reproduced field upon forward quick-motion reproduction according to the present invention.

First, upon double-speed reproduction mode in the forward direction, the reproducing stylus skips at positions V3, V11, V19, V27, . . . , for an interval equal to four fields (one revolution of the disc), that is, the reproducing stylus skips an interval equal to four fields after every fourth field the reproducing stylus reproduces starting by skipping from the third field. Therefore, the reproducing stylus skips at positions aligned to one radial line of the disc. Accordingly, the order of the field numbers of the signals reproduced from the tracks $t_1$, $t_2$, $t_3$, . . . , is A1A2B3B4C1C2D3-D4E1E2F3F4G1G2H3H4I1I2J3J4 . . . , and becomes as shown by the polygonal full line I labelled with 2XF in FIG. 11. In FIG. 11, the parts shown by dotted lines are the skipping parts.

However, upon double-speed reproduction mode in the forward direction according to the above previously proposed system, the order of the field numbers of the signals reproduced is B1B2B3B4D1D2D3D4F1F2F3F4H1H2H3H4J1J2J3-J4 . . . , and becomes as shown by the one-dot chain line Ia in FIG. 11. As clearly seen from the above order of the field numbers, in the previously proposed system, the information contents of the video signal in fields A1 through A4, C1 through C4, E1 through E4, . . . , are completely dropped out, and complete dropout of the information contents in tracks $t_1, t_3, t_5, \ldots$, is introduced. Accordingly, the movement in the reproduced picture becomes irregular and unstable, being intermittent.

As opposed to this previously proposed system, according to the system of the present invention, the video signal in fields A3, A4, B1, B2, C3, C4, D1, D2, ..., are dropped out. However, since the information contents of the video signal in these dropped out fields are identical to those of the video signal in the fields A1, A2, B3, B4, C1, C2, D3, D4, ..., which are reproduced, no information contents of the video signal is dropped out as a result, and the information contents of the video signal from each track turn are reproduced. Hence, the movement in the reproduced picture obtained according to the system of the present invention is smooth.

Upon triple-speed reproduction mode in the forward direction, the reproducing stylus skips at positions V8, V14, V20, ..., for an interval equal to four fields (one revolution of the disc), that is, the reproducing stylus skips an interval equal to four fields after every second field the reproducing stylus reproduces starting by skipping from the second field. Therefore, the reproducing stylus skips at positions aligned to one of two radial lines of the disc. Accordingly, the order of the field numbers of the signals reproduced from the tracks $t_0, t_1, t_2, t_3, \ldots$, is A1B2B3C4D1E2E3F4G1H2H3I4J1K2K3..., and becomes as shown by the polygonal full line II labelled with 3XF in FIG. 11.

However, upon triple-speed reproduction mode in the forward direction according to the above previously proposed system, the order of the field numbers of the signals reproduced is B1B2C3C4E1E2F3F4H1-H2I3I4K1K2..., and becomes as shown by the one-dot chain line IIa in FIG. 11. As clearly seen from the above order of the field numbers, in the previously proposed system, the information contents of the video signals in fields A1 through A4, D1 through D4, G1 through G4, J1 through J4, ..., are completely dropped out, and complete dropout of the information contents in tracks $t_1, t_4, t_7, t_{10}, \ldots$, is introduced. Accordingly, the movement in the reproduced picture becomes irregular and unstable, being intermittent.

But according to the system of the present invention, the movement in the reproduced picture is smooth, since at least one field is reproduced from each track turn.

Similarly, upon quadruple-speed reproduction mode in the forward direction, the reproducing stylus skips at positions V2, V7, V12, V18, V23, V28, ..., for an interval equal to four fields (one revolution of the disc), after every one field the reproducing stylus reproduces except for the every fourth reproduced field, by skipping from the second field. Therefore, the reproducing stylus skips at positions aligned to one of three radial lines of the disc. Accordingly, the order of the field numbers of the signals reproduced from the tracks $t_0, t_1, t_2, t_3, t_4, t_5, \ldots$, is A1B2C3D4E1F2G3H4I1J2K3..., and becomes as shown by the polygonal full line III labelled with 4XF in FIG. 11.

However, upon quadruple-speed reproduction mode in the forward direction according to the above previously proposed system, the order of the field numbers of the signals reproduced is B1C2D3D4F1G2H3H4J1K2..., and becomes as shown by the one-dot chain line IIIa in FIG. 11. As clearly seen from the above order of the field numbers, in the previously proposed system, the information contents of the video signal in fields A1 through A4, E1 through E4, I1 through I4, ..., are completely dropped out, and complete dropout of the information contents in tracks $t_1, t_5, t_9, \ldots$, is introduced. Accordingly, the movement in the reproduced picture becomes irregular and unstable, being intermittent.

However, according to the system of the present invention, the movement in the reproduced picture is smooth, since at least one field is reproduced from each track turn.

Figure 12:
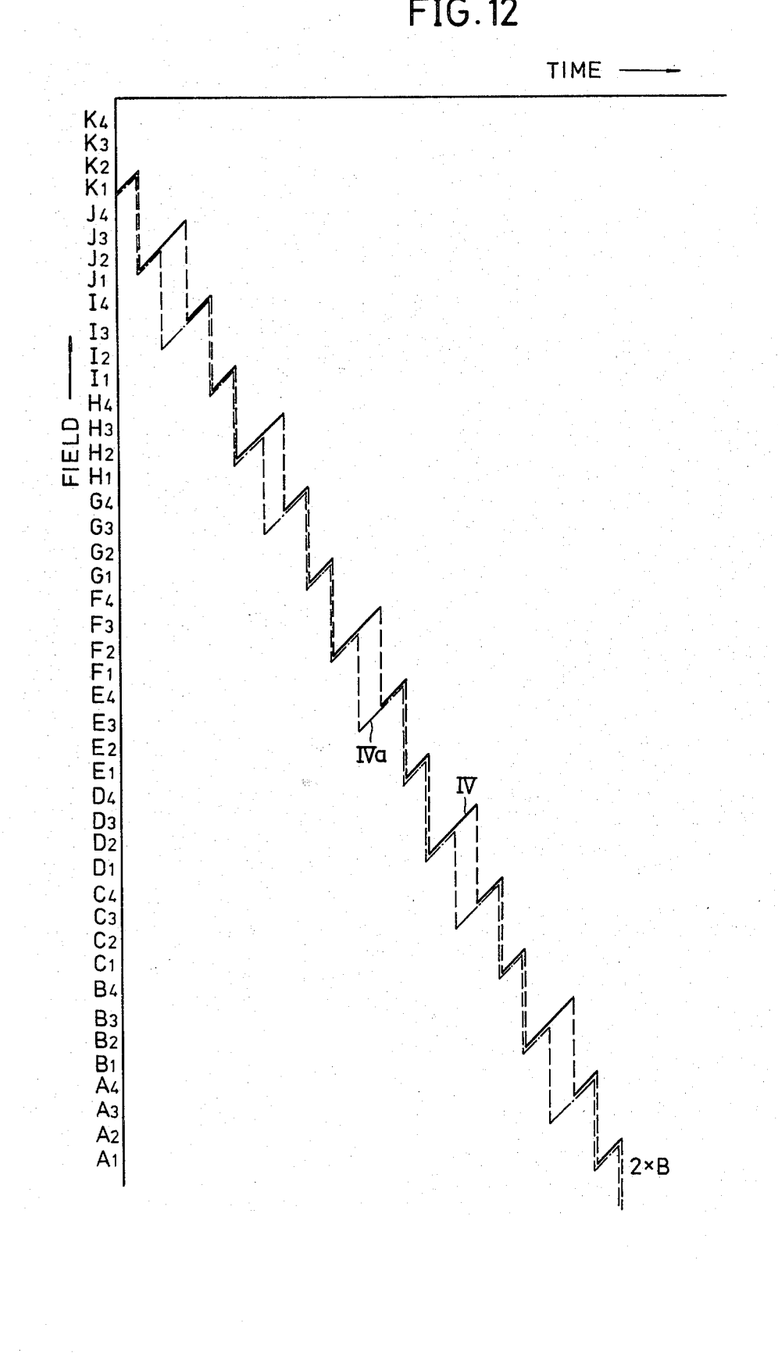
FIG. 12 is a diagram for explaining the reproduced field upon backward quick-motion reproduction according to the present invention.

Next, during double-speed reproduction mode in the backward direction, the reproducing stylus skips at positions V29, V26, V24, V21, V18, ..., that is, at positions aligned to one of three radial lines of the disc. Thus, the order of the field numbers of the signals reproduced from the tracks $t_7, t_7, t_6, t_6, t_5, t_5, \ldots$, is K1J2J3I4I1H2H3G4G1F2F3E4E1D2D3C4C1..., and becomes as shown by the polygonal full line IV labelled with 2XB in FIG. 12. In FIG. 12, the parts shown by the dotted lines indicate the skipping parts.

However, upon double-speed reproduction mode in the backward direction according to the previously proposed system, the order of the field numbers of the signals reproduced is K1J2J3I4I1H2G3G4G1-F2E3E4E1D2C3C4C1..., and becomes as shown by the one-dot chain line IVa in FIG. 12. Although a complete dropout of information contents amounting to one track is not introduced according to the previously proposed system, the movement in the reproduced picture is slightly irregular and unstable, since the reproduced picture obtained in this case is a repetition of "reproduction of one field containing certain information contents" and "reproduction of three fields containing information contents of the previous field".

As opposed to this previously proposed system, according to the system of the present invention, the movement in the reproduced picture is smoother, since the reproduced picture obtained is a repetition of "reproduction of two fields containing identical information contents" and "reproduction of two fields containing identical information contents of the previous field".

Further, this invention is not limited to these embodiments but various variations and modifications may be made without departing from the scope of the invention.

What is claimed is:

1. A special reproducing system in an apparatus for reproducing a rotary recording medium having a video signal recorded on a spiral track, said video signal being recorded in terms of two frames for each track turn of said rotary recording medium, the information content of said two recorded frames being the same in each one track turn, each of said frames comprising two fields, said rotary recording medium having four vertical blanking period recording positions on each track turn of said rotary recording medium, and first or second reference signal having mutually different frequencies being recorded on a reference signal track between adjacent information tracks on said recording medium, said first and second reference signals being alternately changed over and recorded on said reference signal track for each track turn of said rotary recording medium, said rotary recording medium further having a third reference signal recorded at one of the vertical blanking period recording positions corresponding to a part of the track where said first and second reference signals are changed over, said special reproducing system comprising:

a reproducing element for scanning over tracks on said rotary recording medium to reproduce recorded signals;

skipping means for shifting said reproducing element to skip to an adjacent track responsive to skip pulses; and skip pulse supplying means for generating skip pulses corresponding to a mode for performing a special reproduction which is different from a normal reproduction, one of said skip pulses being generated for every revolution period of said rotary recording medium with a timing corresponding to the recorded positions of the vertical blanking periods of the recorded video signal, means for supplying said skip pulses to said skipping means, said skip pulse supplying means generating no skip pulses during a normal-speed reproduction mode so that said reproducing element scans over both of the two frames in one track turn with respect to each of the track turns of said rotary recording medium, said skip pulse supplying means generating skip pulses for skipping said reproducing element at a vertical blanking period recording position opposing a position where said third reference signal is recorded in one track turn with respect to each of the track turns of said rotary recording medium during double-speed reproduction mode in the forward direction, so that said reproducing element scans over one of the two frames in one track turn with respect to each of the track turns, said skip pulse supplying means generating skip pulses for skipping said reproducing element at two vertical blanking period recording positions other than the vertical blanking period recording positions recorded with and opposing said third reference signal in one track turn with respect to each of the track turns of said rotary recording medium upon triple-speed reproduction mode in the forward direction, and said skip pulse supplying means generating skip pulses for skipping said reproducing element at three vertical blanking period recording positions other than the vertical blanking period recording position recorded with said third reference signal in one track turn with respect to each of the track turns of said rotary recording medium upon quadruple-speed reproduction mode in the forward direction.

2. A special reproducing system as claimed in claim 1 in which said skip pulse generating means generates skip pulses for skipping said reproducing element at three vertical blanking period recording positions other than the vertical blanking period recording position opposing the position where said third reference signal is recorded in one track turn with respect to each of the track turns of said rotary recording medium upon double-speed reproduction mode in the backward direction.

3. A special reproducing system as claimed in claim 1 in which said skipping means controls the tracking of said reproducing element so that said reproducing element accurately scans over said track when said reproducing element is not performing a skipping operation.

4. A special reproducing system as claimed in claim 1 in which said skip pulse supplying means generates skip pulses having waveforms which are in mutually reversed relationship when said reproducing element is skipped in the forward and backward directions.

* * * * *